Figure 1:
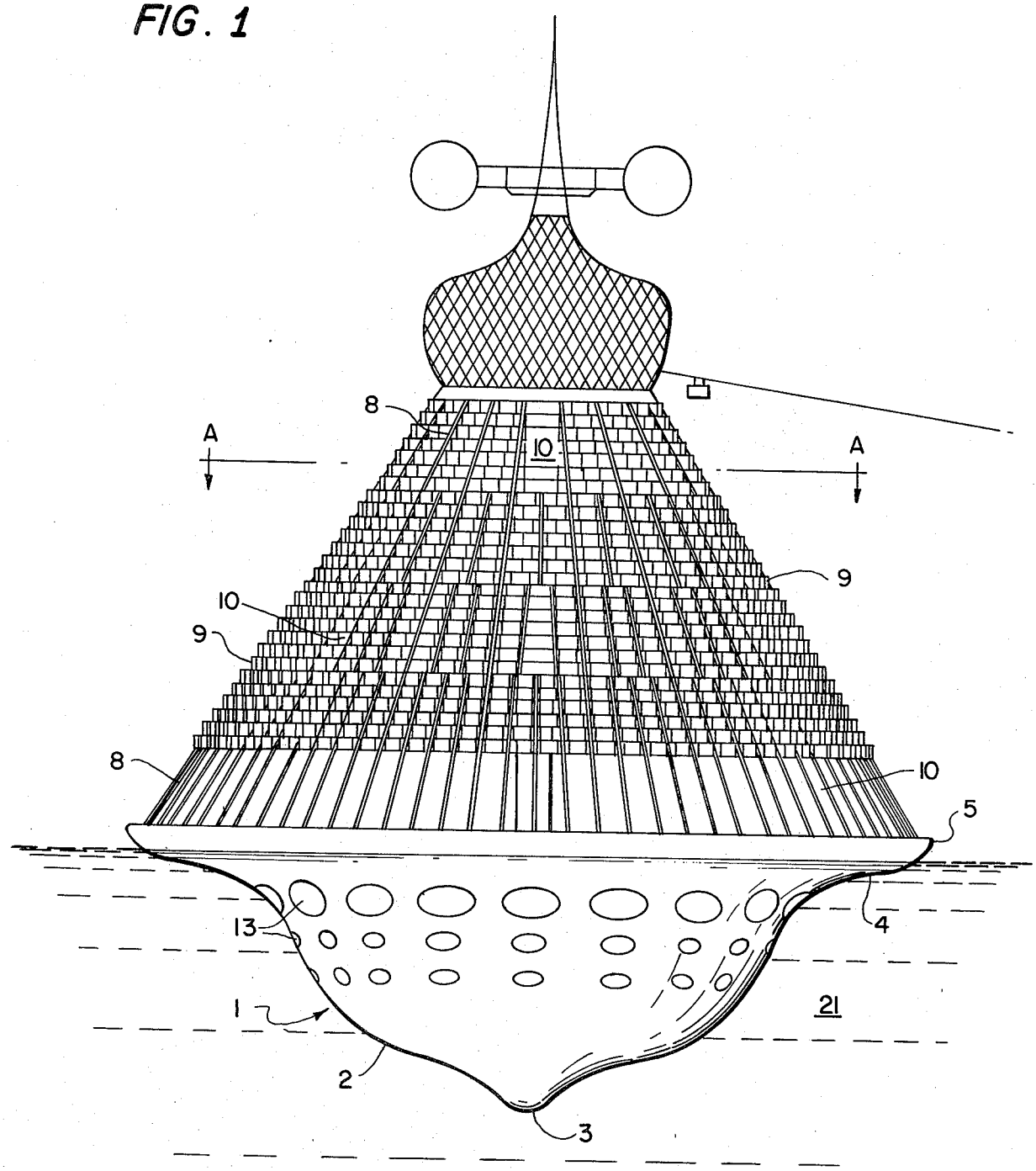

United States Patent [19]

Kim

[11] 4,406,243

[45] Sep. 27, 1983

[54] WATERBORNE STRUCTURE

[75] Inventor: Chung U. Kim, Seoul, Rep. of Korea

[73] Assignee: Chul Ho Kim, Seoul, Rep. of Korea

[21] Appl. No.: 169,785

[22] Filed: Jul. 17, 1980

[30] Foreign Application Priority Data

Jan. 16, 1980 [KR] Rep. of Korea .................. 145/1980

[51] Int. Cl.³ ............................................. B63B 39/00
[52] U.S. Cl. ...................................... 114/264; 52/79.2
[58] Field of Search .................. 52/79.2; 114/56, 125, 114/264–267, 258–263, 71, 66; 9/8 R, 8 P

[56] References Cited

U.S. PATENT DOCUMENTS

| | | | |
|---|---|---|---|
| 3,422,883 | 1/1969 | Daltry | 52/83 |
| 3,724,147 | 4/1973 | Levenson | 52/79.2 |
| 3,785,314 | 1/1974 | Scanlan | 114/266 |
| 3,791,080 | 2/1974 | Sjoberg | 114/266 |
| 3,791,081 | 2/1974 | Felciai | 52/79.2 |
| 4,010,704 | 3/1977 | Mayo | 114/125 |
| 4,118,905 | 10/1978 | Shelley | 52/79.2 |

Primary Examiner—Sherman D. Basinger
Assistant Examiner—C. T. Bartz

[57] ABSTRACT

A waterborne building structure is disclosed comprising a floatable bottom portion generally formed as a hemisphere having a downwardly protruded portion at its lowest end and a disk-shaped upper portion of horizontal form with gradually widening width and vertical supporting walls exposed to the water surface at its uppermost side, pillars extending from said lowest end vertically to a height above said bottom portion approximately equal to the diameter of said upper portion, cables extending from an upper portion of said pillars in a radial form to said supporting walls, prefabricated rooms affixed to said cables arranged in circular form having ventilation spaces between said rooms, first joint spaces with windows in said rooms, second joint spaces in said floatable bottom portion having windows in contact with the water, and third joint spaces arranged in the uppermost portion of said structure.

1 Claim, 5 Drawing Figures

U.S. Patent  Sep. 27, 1983  Sheet 1 of 4  4,406,243

WATERBORNE STRUCTURE

The present invention relates to a structure built to rest on the surface of the sea. The structure on the sea is part of an attempt to utilize the advantages of the ocean environment, which is markedly different in physical conditions from the surface of the earth, for buildings as living spaces for human settlement.

The structure on the sea attaches a great importance to its stability and workmanship in that its foundation is on a floating body which is quite different from the solid soil foundation of building structures on the earth.

An object of the invention is a more intensive spatial composition in view of the fact that the waterborne structure must be provided with all the facilities required for human habitation on a floating body. In other words, the present invention is a building structure floating on the sea which is different in natural conditions from ground surface and characterized by the composition under the environment much different from building structures on the ground in that it can be provided with rocking houses or with windows which are in contact with sea water and through which the sea bottom can be viewed.

Another object is to form, unlike ships or structures on the ground, an efficient and intensive daily living space. It also aims to improve structural workmanship because the structure on the sea is not so freely mobile as ships in taking refuge from storms and because, being a building or residential unit on the sea, it must be provided with stability (hereinafter referred to as "the absolute stability") against the vibration that may be caused on any part of the structural body due to the oscillation or wind pressure resulting from all kinds of ill-conditioned waves and, lastly, because it is a building structure on the sea which is quite different in physical conditions from those on the ground.

The floating body of the present invention is protruded somewhat more downward at the lowest end of the center of a spherical body on a hemisphere with an almost gradually horizontal disk-shape with sufficient opening enabling an upper area of the floating body to widen, having walls exposed above the water surface at the uppermost portion.

The shape of this floating body which forms dull curves scatters the water pressure or shocks caused to the floating body by the waves or tidal power to its right and left or to its bottom.

The upper part of the disk-like shape, as it is in contact with the wider surface of the sea, gives the most of the floatage nearly to the upper portion of the floating body, enabling it to be supported in a wider scope by the surface of the sea.

On the one hand, it is intended to insure the absolute stability of the floating body on which the water-borne structure rests by lowering the center of gravity of the floating body almost as far as to the protruded portion of the lowest end of the spherical body on the hemisphere.

The waterborne structure of the present invention is erected with hollow pillars of the approximate size of the diameter of the floating body at the center of the body, with cables affixed in a radial form from the upper part of the pillars to the walls of the uppermost side of the floating body so that the linkage of the floating body with the waterborne structure can be strengthened. The rooms of living space are fixed properly to the cables arranged in a circular form with enough space for ventilation between the rooms. The wind pressure that acts on the waterborne structure can be minimized to maintain the absolute stability of the floating body.

In this way, the construction of the rooms for living space in the building structure on the sea requires only a prefabricating process that is intended to expedite construction. Consequently, a joint (common) space is formed between the rooms fixed by the cables arranged in a circular form and the multistory joint spaces in the floating body and the upper portion of the floating body, to provide a joint space that is capable of intensively accommodating residential space and various other facilities.

Figure 2:
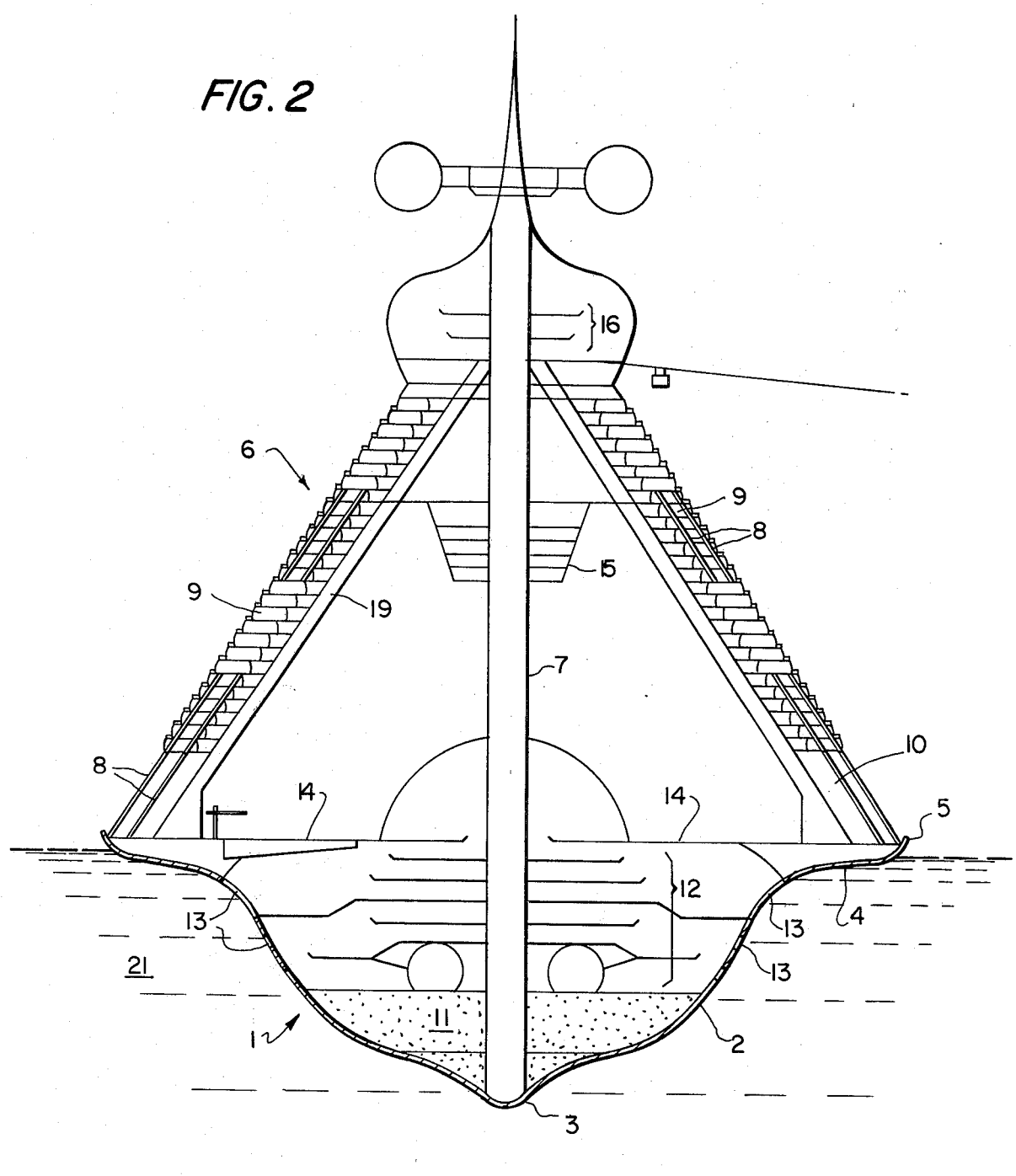
Figure 3:
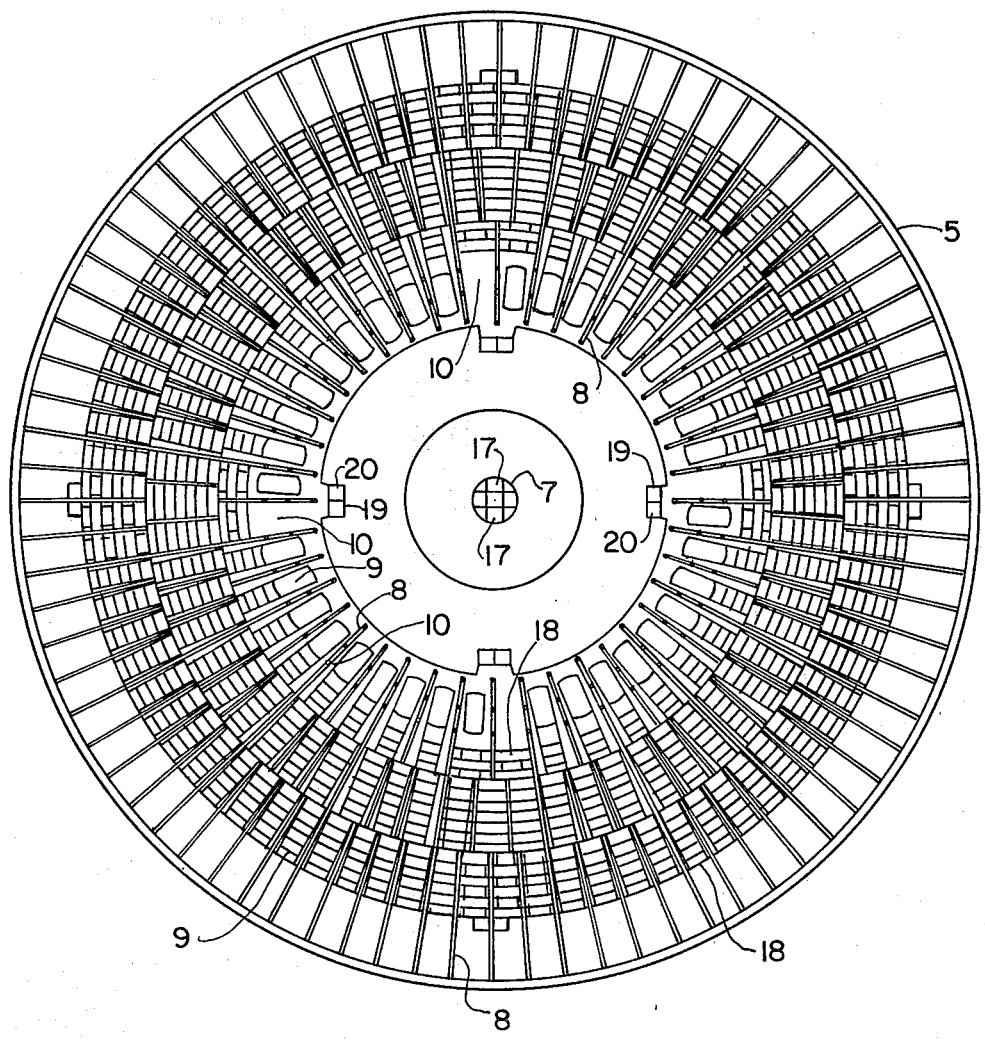
Figure 4:
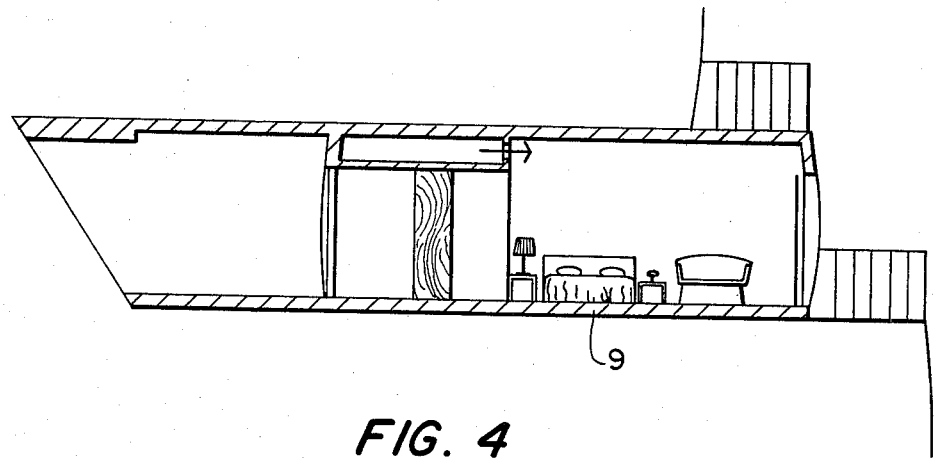
Figure 5:
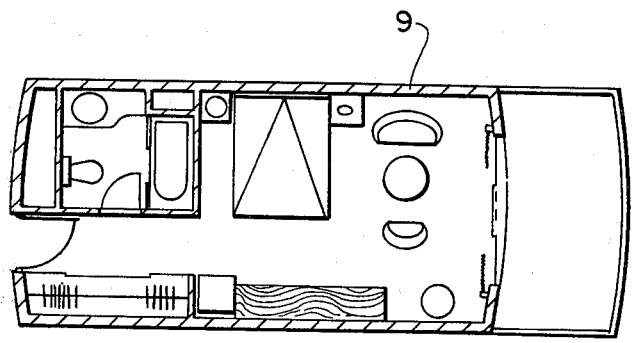

Also, this present invention is to insure the advancement of workmanship for building structures on the sea as the rooms of living space can be affixed to the cables and arranged in a circular form. This present invention can be more clearly seen and explained viewing the drawings as follows:

FIG. 1 is an overall frontal view of the invention;
FIG. 2 is a profile of the invention;
FIG. 3 is a cross-section from A to A of A of FIG. 1; and
FIG. 4 is a cross-section of the rooms supported by cables.
FIG. 5 is a top view of one of the rooms supported by cables.

The floating body 1 is a little more protruded downward at the lowest end of a spherical portion 2, the upper side of which is formed as an almost gradually horizontal disk-shape with sufficient opening that enables the area in contact with sea water to widen and which has walls exposed above the water surface at the uppermost portion 5. The waterborne structure 6 is erected with hollow pillars 7 in a length approximately the diameter of the floating body at its center, with the cables 8 affixed in a radial form from the upper part of the floating body to the supporting walls 5 on the uppermost side of the floating body, suspending rooms for living space on the cables 8 arranged in a circular form with spaces for ventilation 10 between the rooms.

In the interior, or the upper part, of the floating body, joint spaces 12,14 are provided to accommodate various common facilities, and at the center, or the upper part, of the pillars, necessary joint spaces 16,15 are also provided.

At the lower part of the floating body 1, the joint space 12 is provided with the windows 13 which are in contact with the sea water 21 and through which underwater views can be watched.

As an additional composition of the present invention, there are elevators 17 running through the spaces 12,14, 15 and 16 on the support of the hollow pillars 7, hallways 18 horizontally linking the rooms 9 arranged in a circular form on the support of the cables 8, inclined elevators 19 running through said hallways 18 and the open spaces, and the dots for various uses.

Also, the uppermost peak of the pillars will be provided with a windmill power generating unit 22 as a subsidiary power supply source suitable for oceanic environment, and a terminal that can be linked with outside means of transportation, such as floating bridges, vessels, cable cars and aircraft.

The present invention has the following effects of action of the various characteristics of a waterborne building structure:

The floating body 1 of this invention is, in its shape or composition, a spherical body 2 on a hemisphere with its lower center 3 a little more protruded downward, its upper side 4 open in a disk-shape almost in a gradually horizontal form, and with the walls 5 of its uppermost side exposed above the water level. Therefore, most of the floatage (buoyance) is gradually spread horizontally and occurs at the upper part 4 of the wide floating body in a disk-shape supported by the sea water 21. The center of the weight is protruded rather downward to lie in the location of the floating body 1 near the lowest end of the center of the spherical body 2 on a horizon filled with heavy materials 11. Thus, the absolute stability required for building structures on the sea can be insured without necessitating the considerations of economic operation. Also, the water pressure or shock resulting from the sea water is guided or scattered downwardly on the spherical body 2 from the upper side 4 of the spherical body 2 open in a disk-shape of gradually dull curves almost in a horizontal form from the spherical body 2 or to the right or left of the walls of the spherical pillars 7 that are shorter in length than the diameter of the upper side 4 of the disk-shape, so as to maintain the stability of the building structure on the sea.

The structure 6 of the upper part of the floating body comprises cables 8 in a circular form from the upper portion of the pillars 7 erected at the center of the floating body to the supporting walls 5 at the uppermost portion of the floating body with the rooms 9 of living space suspended by the cables 8 so as to provide spaces for ventilation 10.

Consequently, as a building structure on the sea, the linkage of the floating body 1 with the waterborne structure 6 can be strengthened and the wind pressure acting on the structure at the upper part of the floating body is weakened as it scatters through the spaces for ventilation 10 between the rooms. The building structure on the sea 6 forms a spherical shape which becomes weak in resisting gaseous bodies as it goes up to maintain the absolute stability of building structures on the sea.

The rooms 9 which are spaces for living are arranged and supported in a spherical form by the cables 8 forming a circular form which is excellent in taking in sunlight and ventilation or in view, and are accessible through the hallways 18 horizontally contiguous to the rooms and inclined elevators 19 linking these hallways with the rooms with joint spaces 12 for accommodating cultural, welfare and recreation facilities in the floating body for common use having the windows 13 in contact with the sea water through which underwater scenes can be watched. The semi-open space 14 at the upper part of the floating body 1 consisting of spaces under the cables 8 arranged in a circular form can be ventilated directly to the surface of the sea and take in a fixed amount of sunlight and thus provides space for common facilities for other purposes with the spaces 15 and 16 that are providing for other common facilities, such as places for gathering at the center or the upper part of the pillars.

These joint use spaces 12, 14, 15 and 16 are accessible by elevators 17 supported by pillars 7 and provide accessibility from these spaces to the rooms which are living spaces through inclined elevators 19.

As the present invention, in its workmanship, requires only the prefabrication process of affixing the rooms 9 which are living spaces with the cables 8, part of the workmanship of building structures on the sea has become improved.

The present invention, as stated in the foregoing, is a building structure on the sea on a buoyant foundation, characterized by the intensive accommodation of living spaces for various purposes and the absolute stability for building structures on the sea.

What is claimed:

1. A waterborne building structure comprising:
    a floatable bottom portion generally formed as a hemisphere having a downwardly protruded portion at is lowest end and a disk-shaped upper portion of horizontal form with gradually widening width and vertical supporting walls exposed to the water surface at its uppermost side;
    pillars centrally extending from said lowest end vertically to a height above said bottom portion approximately equal to the diameter of said upper portion;
    cables extending from an upper portion of said pillars extending in a radial form to said supporting walls;
    prefabricated rooms affixed to said cables arranged in circular form having ventilation spaces between said rooms;
    first joint-use spaces with windows adjacent said rooms;
    second joint-use spaces in said floatable bottom portion having windows in contact with the water; and
    third joint-use spaces arranged in the uppermost portion of said structure.

* * * * *